United States Patent
Jeffery et al.

(10) Patent No.: US 10,744,829 B2
(45) Date of Patent: *Aug. 18, 2020

(54) AMPHIBIOUS VEHICLE POWER TRAINS

(71) Applicant: Gibbs Technologies LTD, Nuneaton, Warwickshire (GB)

(72) Inventors: Glen Michael Jeffery, Auckland (NZ); Hans Weekers, Auckland (NZ); Simon James Longdill, Auckland (NZ); Stephen John Briggs, Auckland (NZ)

(73) Assignee: Gibbs Technologies LTD, Nuneaton (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/707,533

(22) Filed: Sep. 18, 2017

(65) Prior Publication Data
US 2018/0065434 A1    Mar. 8, 2018

Related U.S. Application Data

(63) Continuation of application No. 13/907,714, filed on May 31, 2013, now Pat. No. 9,764,611, which is a continuation of application No. 11/793,936, filed as application No. PCT/GB2005/005001 on Dec. 21, 2005, now Pat. No. 8,454,398.

(30) Foreign Application Priority Data

Dec. 22, 2004 (GB) .................................. 0428055.8

(51) Int. Cl.
*B60F 3/00* (2006.01)

(52) U.S. Cl.
CPC .............. *B60F 3/0007* (2013.01); *B60F 3/00* (2013.01); *B60F 3/0053* (2013.01)

(58) Field of Classification Search
CPC ......... B60F 3/00; B60F 3/0007; B60F 3/0053
USPC ....................... 440/12.5, 12.51, 12.54, 12.57
See application file for complete search history.

(56) References Cited

U.S. PATENT DOCUMENTS

| | | |
|---|---|---|
| 1,550,344 A | 8/1925 | Copes |
| 2,350,037 A | 5/1944 | Hofheins et al. |
| 2,878,883 A | 3/1959 | Le et al. |
| 3,446,174 A | 5/1969 | Ballu |
| 3,450,089 A | 6/1969 | Lippincott |
| 3,903,831 A | 9/1975 | Bartlett |
| 4,257,505 A | 3/1981 | Stodt |
| 5,531,179 A | 7/1996 | Roycroft et al. |
| 5,562,066 A | 10/1996 | Gere et al. |

(Continued)

FOREIGN PATENT DOCUMENTS

| | | |
|---|---|---|
| DE | 1530577 A1 | 12/1969 |
| DE | 3916200 A1 | 11/1990 |

(Continued)

*Primary Examiner* — Lars A Olson
(74) *Attorney, Agent, or Firm* — Fulwider Patton LLP

(57) ABSTRACT

An amphibious vehicle power train having an engine (2) with an output shaft (4), driving an input member (6) of a variable speed change transmission (11). The speed change transmission, which may be a continuously variable transmission is arranged to drive road wheels through an output member (8). The engine also drives a marine propulsion unit (24). The axis of the output member (8) is above the axis of the input member (6). Four wheel drive may be provided (FIG. 2).

14 Claims, 2 Drawing Sheets

(56) References Cited

U.S. PATENT DOCUMENTS

| | | | |
|---|---|---|---|
| 5,690,046 A * | 11/1997 | Grzech, Jr. | B60F 3/0053 |
| | | | 440/12.5 |
| 6,575,796 B1 | 6/2003 | McDowell | |
| 6,626,712 B1 | 9/2003 | Bellezza Quater et al. | |
| 6,672,916 B1 | 1/2004 | Lent-Phillips et al. | |
| 6,764,358 B2 | 7/2004 | Gibbs | |
| 6,776,672 B2 | 8/2004 | Roycroft | |
| 6,957,991 B2 | 10/2005 | Gibbs | |
| 7,011,557 B2 | 3/2006 | Gibbs | |
| 7,089,822 B2 | 8/2006 | Gibbs et al. | |
| 7,214,112 B2 * | 5/2007 | Gibbs | B60F 3/0007 |
| | | | 440/12.51 |
| 7,410,396 B2 | 8/2008 | Longdill et al. | |
| 7,416,457 B2 | 8/2008 | Gibbs | |
| 7,425,103 B2 | 9/2008 | Perez-Sanchez | |
| 7,713,102 B2 | 5/2010 | Longdill et al. | |
| 7,770,483 B2 | 8/2010 | Gibbs | |
| 8,454,398 B2 * | 6/2013 | Jeffery | B60F 3/0007 |
| | | | 440/12.51 |
| 9,764,611 B2 * | 9/2017 | Jeffery | B60F 3/0007 |

FOREIGN PATENT DOCUMENTS

| | | |
|---|---|---|
| DE | 19926145 A1 | 12/2000 |
| FR | 2181604 A1 | 12/1973 |
| GB | 142120 A | 7/1921 |
| GB | 184294 A | 8/1922 |
| GB | 350257 A | 6/1931 |
| GB | 2134857 A | 8/1984 |
| JP | 2000001559 A | 1/2000 |
| RU | 2243109 C2 | 12/2004 |
| SU | 1752584 A1 | 8/1992 |

\* cited by examiner

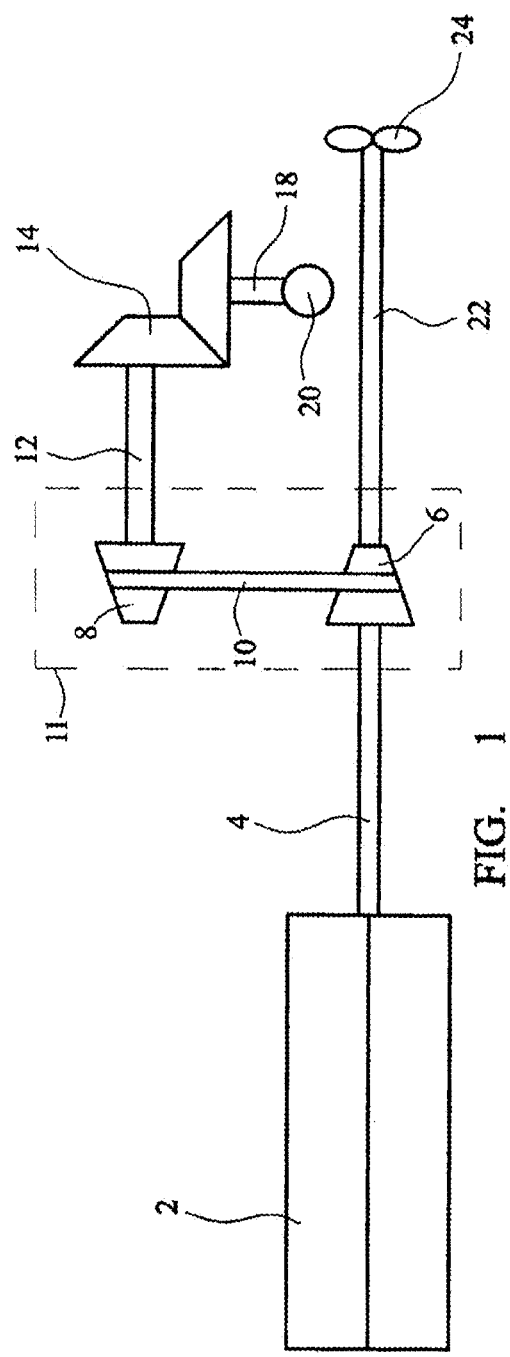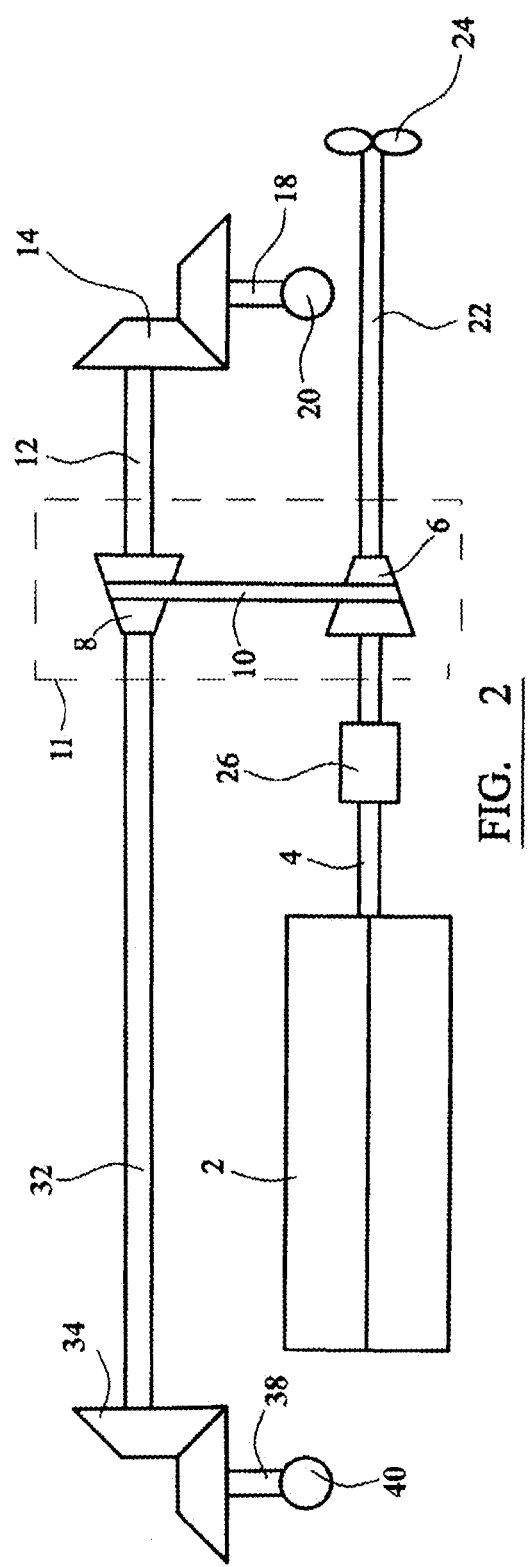

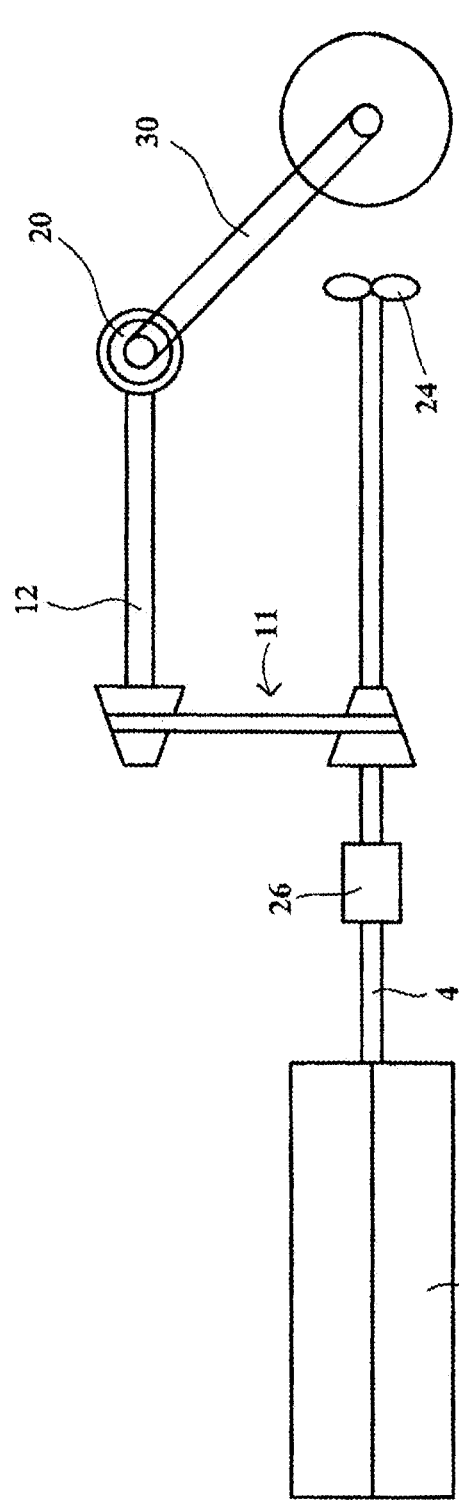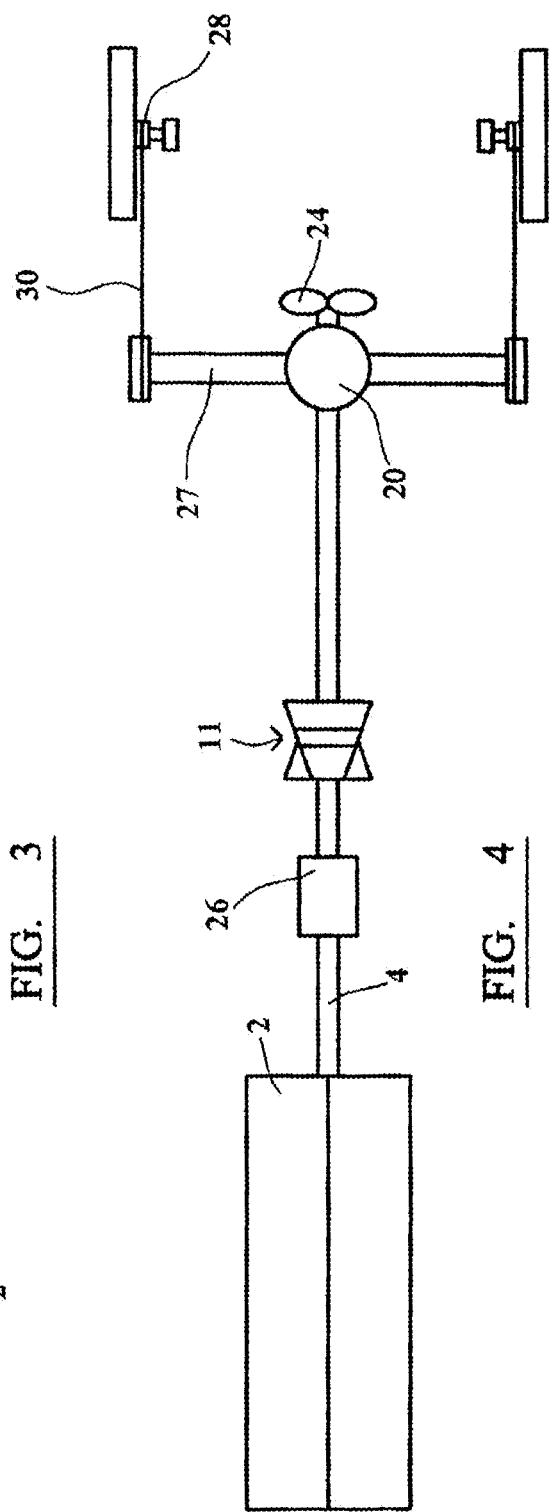

AMPHIBIOUS VEHICLE POWER TRAINS

CROSS-REFERENCES TO RELATED APPLICATIONS

This application is a continuation of application U.S. application Ser. No. 13/907,714 filed May 31, 2013, which is a continuation of U.S. application Ser. No. 11/793,936 filed Aug. 8, 2008, now U.S. Pat. No. 8,454,398, which is a national phase of PCT/GB05/05001, filed Dec. 21, 2005, which claims priority from Great Britain Application No. 0428055.8, filed Dec. 22, 2004, incorporated by reference in its entirety.

BACKGROUND

The present invention relates to amphibious vehicles and in particular to power trains for such vehicles.

In one power train layout for an amphibious vehicle, as described in the applicant's co-pending application no. GB0422954.8, an engine is arranged so that its crankshaft drives a gearbox from which road and marine drive outputs are taken. The road drive is turned through an angle of up to 90.degree. by means of a bevel gearbox so as to provide an upwardly angled drive to a continuously variable transmission (CVT) speed change unit of the sort having two pulleys interconnected by a belt, which belt runs in a substantially horizontal plane. The output of the CVT unit then by means of a further substantially vertical shaft drives a differential coupled to the rear road wheels.

A problem with the aforesaid arrangement is that the provision of the CVT unit much above the crankshaft axis tends to cause vibration; while the location of the CVT unit weighing up to say 30 kg increases the amphibious vehicle's top weight. This in turn raises the vehicle's centre of gravity and increases its metacentric height, which deleteriously affects vehicle handling on both land and water.

SUMMARY OF THE INVENTION

Accordingly, the present invention provides an amphibious vehicle power train as claimed in claim 1. This improved power train arrangement retains the advantages of the prior arrangement in packaging terms, with reduced vibration and improved weight distribution. Where retractable wheels are provided, it is desirable for such wheels to be clear of water when the vehicle banks into turns on water. The geometry of wheel retraction may force the differential(s) to be mounted well above the bottom of the hull; particularly where a deep vee hull is provided to optimize vehicle handling on water. The power train claimed allows the road drive to leave the speed change transmission at a level above the engine output shaft, which in turn allows the mass of the engine to be kept low in the vehicle. This keeps the centre of gravity low, and maximizes metacentric height. These effects minimize vehicle roll and maximize stability on both land and water.

Where the marine drive is level with the engine output shaft, this ensures a substantially straight run from the engine output shaft to the marine drive. Prior art marine drives such as Aquastrada (U.S. Pat. No. 5,562,066) and Simpson (GB 2,134,857) comprise angled drives to the marine drive, which can waste power and create vibration and durability problems.

It should be noted that wherever a speed change transmission is referred to hereinafter in this specification, this is a variable speed transmission offering a plurality of ratios of input member speed to output member speed.

Reference will now be made to embodiments of the invention illustrated in the accompanying drawings, by way of example only.

BRIEF DESCRIPTION OF THE DRAWINGS

FIG. 1 is a schematic side elevation of a power train for an amphibious vehicle;

FIG. 2 is a schematic side elevation of a power train for an amphibious vehicle incorporating a reduction gearbox on the engine output shaft;

FIG. 3 is a schematic side elevation of an alternative configuration of power train for an amphibious vehicle; and FIG. 4 is a schematic plan elevation of the alternative version of the power train as illustrated in FIG. 3.

DETAILED DESCRIPTION OF THE PREFERRED EMBODIMENTS

With reference to FIG. 1, engine 2 supplies drive via output shaft 4. Continuously Variable Transmission (CVT) input member 6 is mounted on the end of the engine output shaft 4, and connected to a CVT output member 8 via drive belt 10. The CVT output member 8 is provided with a CVT output shaft 12, which drives a bevel gearbox 14 driving down to a differential 20 with a vertical input 18. The CVT input and output members 6, 8 and drive belt 10 form a speed change transmission 11.

The marine propulsion unit 24 receives drive via marine driveshaft 22.

FIG. 2 illustrates the power drive of FIG. 1 with a reduction gearbox 26 provided on engine output shaft 4. This figure also shows a four-wheel-drive system, with drive taken forward from CVT output member 8 through driveshaft 32 to a forward bevel gearbox 34, which in turn drives front wheels (not shown) through differential 40 with vertical input 38.

FIG. 3 shows an alternative embodiment of the power train, with the differential 20 placed at the back of the CVT output shaft 12, with driveshafts 27 driving down to wheel driveshafts 28 by chains or belts 30.

FIG. 4 is a schematic plan elevation of the alternative version of the power train as illustrated in FIG. 3.

Although a longitudinally mounted "North-South" engine is shown, the transmission layout may in a further embodiment be used with a transverse engine; or even with a vertical crankshaft engine, as is known in marine prior art. Although an engine output shaft separate to an engine crankshaft is shown, said output shaft may be the engine crankshaft; or the prime rotating shaft of an electric motor.

The transmission output shaft 12, as shown in FIG. 1, is above the level of the top of the engine; broadly a prime mover; or at least above all rotating parts thereof. The transmission output shaft may be directly above the input shaft, which is the engine output shaft 4, to allow a forward drive shaft 32 to pass above the engine. In a further embodiment, the output shaft may be laterally offset relative to the input shaft, enabling a lower centre of gravity by running the forward drive shaft alongside at least some parts of the prime mover. In another embodiment, a centre differential is connected to the forward driveshaft 32, to enable speed difference and torque division between front and rear axles.

The marine, propulsion unit 24 is shown diagrammatically, since it may comprise one or more jet drives. The reduction gearbox 26 is shown as being between the engine and both road and marine drives; but in another embodiment (not shown), it is connected only to the marine drive. In a further embodiment (not shown), the reduction gearbox is connected only to the road drive. Depending on the characteristics of the prime mover chosen, a speed increase gearbox may be used instead; or even a range change gearbox, particularly where all road wheels are driven. Where a CVT is used without a reverse gear, a separate reversing drive may be supplied, as shown in the applicant's co-pending application no. GB0422954.8 (item 110, FIG. 6). Clutches or decouplers may be fitted to the road or marine drive, or to both.

As the power train layout described is essentially tall and narrow, it is particularly suited to a vehicle with passenger seating (not shown) arranged above the power train; more particularly, in line astern. It is also particularly suited to a vehicle whose road wheels are retractable above the vehicle water line to reduce hydrodynamic drag when the vehicle is used on water. The wheel retraction may be at an angle to the road going position, as shown in the applicant's co-pending application no. GB0422954.8 (FIG. 1).

The seating and wheel retraction arrangements described above are particularly suited to a planing vehicle; and especially to a planing vehicle with a deep vee hull.

It will be appreciated that various changes may be made to the above described embodiment without departing from the fundamental inventive concept. For example, the speed change transmission unit may be a conventional manual gearbox; a semi-automated manual gearbox; or a fully automatic transmission with torque converter and hydraulic drive, as is well known in road vehicles. The term engine may mean an internal combustion engine, but the transmission layout described could be found equally suitable to an external combustion engine, or indeed to a fuel cell and motor combination.

We claim:

1. An amphibious vehicle power train for an amphibious vehicle having one or more retractable wheels, the amphibious vehicle power train comprising an engine having an engine output shaft, a marine propulsion unit, a variable speed change transmission and road wheels, the speed change transmission having an input member and a first output member arranged to interact with the input member, the first output member having an output axis at a higher level than, or laterally offset relative to, an axis of the engine output shaft, the road wheels being arranged to be driven by, or via, the first output member.

2. An amphibious vehicle power train as claimed in claim 1 wherein the output axis of first output member is substantially parallel to an axis of the input member and to the axis of the engine output shaft.

3. An amphibious vehicle power train as claimed in claim 1 wherein the speed change transmission has a further output member which is arranged to drive the marine propulsion unit.

4. An amphibious vehicle power train as claimed in claim 3, wherein the further output member has an axis at a level below, and/or laterally offset relative to, the output axis of the first output member.

5. An amphibious vehicle power train as claimed in claim 1 wherein the speed change transmission is mounted such that an axis of the input member and the output axis of the first output member are at a level above, and/or laterally offset relative to, the axis of the engine output shaft.

6. An amphibious vehicle power train as claimed in claim 1 wherein the speed change transmission is a continuously variable transmission in which the interaction between the input member and the first output member is provided by means of a belt.

7. An amphibious vehicle power train as claimed in claim 1 wherein the input member and the first output member have conical driving and driven surfaces respectively.

8. An amphibious vehicle power train as claimed in claim 1 wherein a speed reduction gearbox is provided between the engine and the speed change transmission or on the engine output shaft.

9. An amphibious vehicle power train as claimed in claim 1 wherein the speed change transmission offers a plurality of ratios of input member speed to output member speed.

10. An amphibious vehicle power train as claimed in claim 1 further comprising a forward drive shaft having an axis which is at a higher level than, or laterally offset relative to, the axis of the engine output shaft, such that the forward drive shaft extends above, or laterally alongside, at least some parts of the engine to drive at a least one road wheel.

11. An amphibious vehicle power train as claimed in claim 1 further comprising a marine driveshaft arranged to drive a marine propulsion unit.

12. An amphibious vehicle power train as claimed in claim 1 further comprising a marine driveshaft, wherein the marine driveshaft has an axis which is longitudinally aligned with the axis of the engine output shaft.

13. An amphibious vehicle power train as claimed in claim 1 further comprising a marine driveshaft, wherein the marine driveshaft is coupled to the input member of the variable speed change transmission.

14. An amphibious vehicle power train as claimed in claim 1 wherein the speed change transmission comprises a conventional manual gearbox, a semi-automated manual gearbox, or a fully automatic transmission.

* * * * *